United States Patent
Nickel

(10) Patent No.: US 11,018,894 B2
(45) Date of Patent: May 25, 2021

(54) APPARATUSES AND METHODS FOR TRANSMITTING A COMMUNICATION SIGNAL AND ELECTRIC POWER BETWEEN TWO USER STATIONS OF A BUS SYSTEM

(71) Applicant: Robert Bosch GmbH, Stuttgart (DE)

(72) Inventor: Patrick Nickel, Birstein (DE)

(73) Assignee: Robert Bosch GmbH, Stuttgart (DE)

( * ) Notice: Subject to any disclaimer, the term of this patent is extended or adjusted under 35 U.S.C. 154(b) by 269 days.

(21) Appl. No.: 15/772,306

(22) PCT Filed: Nov. 7, 2016

(86) PCT No.: PCT/EP2016/076780
§ 371 (c)(1),
(2) Date: Apr. 30, 2018

(87) PCT Pub. No.: WO2017/084900
PCT Pub. Date: May 26, 2017

(65) Prior Publication Data
US 2018/0331854 A1    Nov. 15, 2018

(30) Foreign Application Priority Data
Nov. 16, 2015   (DE) .................. 10 2015 222 546.1

(51) Int. Cl.
*H04L 27/30*      (2006.01)
*H04L 12/40*      (2006.01)
(Continued)

(52) U.S. Cl.
CPC ........ *H04L 12/40169* (2013.01); *H04L 12/10* (2013.01); *H04L 12/40045* (2013.01);
(Continued)

(58) Field of Classification Search
CPC .............. H04L 12/10; H04L 12/40045; H04L 12/40169; H04L 12/4135;
(Continued)

(56) References Cited

U.S. PATENT DOCUMENTS 5,084,868 A  *  1/1992 Kelly .................... G08C 15/04
                                                           340/538.11
5,444,608 A      8/1995 Jain et al.
(Continued)

FOREIGN PATENT DOCUMENTS

DE    10 2012 110 732 B3    6/2013
WO       2011/006839 A1     1/2011

OTHER PUBLICATIONS

International Search Report corresponding to PCT Application No. PCT/EP2016/076780, dated Feb. 7, 2017 (German and English language document) (7 pages).

*Primary Examiner* — Sithu Ko
(74) *Attorney, Agent, or Firm* — Maginot, Moore & Beck LLP

(57) ABSTRACT

A method of transmitting a communication signal and electric power between two user stations of a bus system includes coupling the communication signal into a bus line via a low-pass filter that filters the communication signal, such that signal frequencies below a cut-off frequency of the low-pass filter are coupled into the bus line of the bus system. The method also includes coupling, using a power coupling device, electric power in the form of a high-frequency signal into the bus line, transmitting the communication signal and the electric power as a bus signal to an electrical load using the bus line, and decoupling the communication signal from the bus line via a low-pass filter that filters the bus signal, such that signal frequencies below the
(Continued)

cut-off frequency of the low-pass filter are decoupled from the bus line of the bus system.

2 Claims, 4 Drawing Sheets

(51) Int. Cl.
*H04L 12/10* (2006.01)
*H04L 12/413* (2006.01)
(52) U.S. Cl.
CPC .............. *H04L 12/4135* (2013.01); *H04L 2012/40215* (2013.01); *H04L 2012/40273* (2013.01)
(58) Field of Classification Search
CPC ........... H04L 2012/40215; H04L 45/24; H04L 47/125; H04L 2012/40273; H04M 3/22
See application file for complete search history.

(56) References Cited

U.S. PATENT DOCUMENTS

| | | | |
|---|---|---|---|
| 5,579,335 A * | 11/1996 | Sutterlin | H04B 1/707 375/150 |
| 6,405,330 B1 * | 6/2002 | Hanf | B60R 16/0315 714/712 |
| 9,071,407 B2 * | 6/2015 | Chandrasekaran | H04L 1/242 |
| 9,851,772 B2 * | 12/2017 | Dwelley | H04L 12/10 |
| 2008/0175344 A1 * | 7/2008 | Menolfi | H03L 7/07 375/376 |
| 2009/0210737 A1 * | 8/2009 | Tajima | H04L 12/10 713/340 |
| 2011/0098865 A1 * | 4/2011 | Kitano | H04L 12/10 700/286 |
| 2011/0112700 A1 * | 5/2011 | Tajima | H04L 12/40045 700/293 |
| 2011/0233998 A1 * | 9/2011 | Tajima | G06F 1/189 307/18 |
| 2013/0169421 A1 | 7/2013 | Murase et al. | |
| 2013/0322461 A1 * | 12/2013 | Poulsen | H04J 3/02 370/458 |
| 2015/0222398 A1 * | 8/2015 | Ott | H04B 3/542 370/430 |
| 2015/0280783 A1 * | 10/2015 | Seifried | H04L 12/40045 375/239 |
| 2015/0288184 A1 * | 10/2015 | Kalhoff | H04L 12/10 307/12 |
| 2016/0141955 A1 * | 5/2016 | Seifried | H02J 1/00 323/282 |

* cited by examiner

APPARATUSES AND METHODS FOR TRANSMITTING A COMMUNICATION SIGNAL AND ELECTRIC POWER BETWEEN TWO USER STATIONS OF A BUS SYSTEM

This application is a 35 U.S.C. § 371 National Stage Application of PCT/EP2016/076780, filed on Nov. 7, 2016, which claims the benefit of priority to Serial No. DE 10 2015 222 546.1, filed on Nov. 16, 2015 in Germany, the disclosures of which are incorporated herein by reference in their entirety.

The disclosure relates to apparatuses and methods for transmitting a communication signal and electric power between two subscriber stations of a bus system, wherein the apparatuses and the method ensure a supply of power by means of a high-frequency signal and thereby, even for a CAN bus system, allow transmission of the communication signal and of electric power on one line.

BACKGROUND

The CAN bus system is used for a communication between sensors and controllers, for example in automobiles. The CAN bus system involves messages being transmitted by means of the CAN protocol, as described in the CAN specification in ISO11898.

The wiring of sensor(s) and controller(s) normally requires separate lines for the communication between sensor and controller and for the power supply for the sensor and the controller. This requires a large number of lines, giving rise to a great need for materials and space, a high level of outlay for installation and moreover a high fire risk.

To solve these problems, technologies such as powerline communication or power-over-dataline or power-over-Ethernet (PoE) have been proposed, according to which shared use of lines for communication and power supply is possible.

Powerline communication communicates using an existing power supply line in a power supply system that is operated e.g. in buildings particularly at voltages of 110 V, 230 V, etc., in vehicles of voltages of 12 V, etc. This involves a signal with a high-frequency transmission spectrum being additionally modulated onto the electric current for the power supply and being transmitted via the power supply line. One problem with this method, however, is that the costs and hence efficiency thereof, when combined with high data rates, that is to say a large volume of communication data per unit time, with high currents or a high load power, sharply decreases, since expensive additional components are necessary.

Moreover, it would be possible to use a method known as power-over-dataline or power-over-Ethernet (PoE). This involves a point-to-point connection between end points/nodes as subscriber stations, such as a sensor, an electronic control unit (ECU, controller), a switch, for example, being used in a switched (Ethernet) architecture. For the purpose of inputting/outputting or decoupling (splitters) direct current (DC) and high-frequency communication signal (HF communication signal), transformers inter alia are used at all end points/nodes. The decoupling is performed by a splitter, which is a combination of a high-pass and a low-pass filter. The cutoff frequency for decoupling is placed very low, so that even existing communication systems can be matched to the missing or unusable DC component.

However, both solutions cannot be used for the existing CAN bus system, since without complex and therefore expensive modification of the controllers (controller, ECU) or modulation it is not possible for the DC voltage component (DC component) to be separated. The reason is that otherwise the arbitration customary for CAN would not work or it would be necessary to use an altered arbitration method. The arbitration takes place before a transmission of data via a bus line of the bus system and, for a CAN bus system, ensures that a subscriber station of the bus system at least intermittently has exclusive collision-free access to the bus line.

SUMMARY

It is therefore an object of the present disclosure to provide apparatuses and methods for transmitting a communication signal and electric power between two subscriber stations of a bus system that solves the aforementioned problems. In particular, the aim is for apparatuses and methods for transmitting a communication signal and electric power between two subscriber stations of a bus system to be provided that allow simple, reliable and inexpensive transmission of signals and electric power between the two subscriber stations in bus systems, such as the CAN, LIN bus system or other bus systems.

This object is achieved by an apparatus for inputting a communication signal and electric power for at least one electrical load into a bus line for a bus system having the features of claim 1 disclosed herein. The apparatus comprises a low-pass filter for filtering the communication signal such that signal frequencies below the cutoff frequency of the low-pass filter are input into the bus line of the bus system, and/or a power input device for inputting electric power in the form of a high-frequency signal into the bus line.

Instead of a power supply by means of DC component, the apparatus is used to provide the electric power required for the supply of power as a high-frequency signal and hence to transmit said electric power via the shared line for power supply and communication signal in high-frequency fashion.

The apparatus can quite easily be added to an existing bus system later, which ensures that the bus system has a high-frequency power supply (HF power supply) added. An HF power supply is accordingly realized by means of a bus system or communication lines.

Advantageous further configurations of the apparatus are specified in the dependent claims.

Possibly, the power input device has a switched-mode power supply unit for generating the high-frequency signal. Alternatively or additionally, the power input device may be configured to spread and/or jitter the frequency of the high-frequency signal in the frequency domain. Alternatively or additionally, it is also possible for the input of the communication signal to be configured in regard to a communication for which, at least intermittently, exclusive, collision-free access by one of at least two subscriber stations of the bus system to the bus line is ensured.

Advantageously, the power input device has a downstream high-pass filter for filtering the signal of the switched-mode power supply unit such that signal frequencies above the cutoff frequency of the high-pass filter are input into the bus line.

The object is moreover achieved by an apparatus for outputting a communication signal and electric power for at least one electrical load from a bus system on a bus line of a bus system having the features disclosed herein. The apparatus comprises a low-pass filter for filtering the bus signal such that signal frequencies below the cutoff frequency of the low-pass filter are output from the bus line of the bus system as a communication signal, and a power output device for outputting electric power in the form of a high-frequency signal from the bus line.

The apparatus for outputting can interact with the apparatus for inputting described above in order to provide the electric power required for the power supply as a high-frequency signal and the communication signal after transmission thereof via the shared line.

The apparatus for outputting can also quite easily be added to an existing bus system later, which ensures that the bus system has a high-frequency power supply (HF power supply) added.

Advantageous further configurations of the disclosure are specified in the dependent claims.

Possibly, the power output device has: a rectifier for smoothing the high-frequency signal for supplying the electrical load with the electric power, and a low-pass filter for filtering the signal rectified by the rectifier such that signal frequencies below the cutoff frequency of the low-pass filter are passed to the electrical load.

The power output device may have an upstream high-pass filter for filtering the bus signal such that signal frequencies above the cutoff frequency of the high-pass filter are output from the bus line. Alternatively or additionally, the output of the communication signal may be configured in regard to a communication for which, at least intermittently, exclusive, collision-free access by one of at least two subscriber stations of the bus system to the bus line is ensured.

In the case of the apparatuses for inputting or outputting that are described above, it is conceivable for the cutoff frequency of the low-pass filter and the cutoff frequency of the high-pass filter to be designed for a cutoff frequency in the range from 20 to 50 MHz. This allows the high-frequency signal to be allocated depending on the data transmission rate in a frequency range that is not significant for a CAN or CAN FD signal as communication signal.

Alternatively or additionally, the communication signal may be designed in accordance with the CAN protocol and/or the CAN FD protocol and/or the TTCAN protocol.

The apparatuses for inputting or outputting that are described above may also be part of a bus system that has a bus line and at least two subscriber stations that are connected to one another by means of the bus line for communication. In this case, at least one of the subscriber stations can have an apparatus for inputting and at least one of the subscriber stations can have an apparatus for outputting.

In this case, at least one of the subscriber stations can also have an apparatus for inputting and an apparatus for outputting. By way of example, this is conceivable for a controller having an integrated sensor.

The aforementioned object is moreover achieved by methods for transmitting a communication signal and electric power between two subscriber stations of a bus system as disclosed herein. The method comprises the steps of: inputting the communication signal into the bus line via a low-pass filter that filters the communication signal such that signal frequencies below the cutoff frequency of the low-pass filter are input into the bus line of the bus system, inputting, using a power input device, electric power in the form of a high-frequency signal into the bus line, transmitting the communication signal and the electric power as a bus signal to the electrical load using the bus line, outputting the communication signal from the bus line via a low-pass filter that filters the bus signal such that signal frequencies below the cutoff frequency of the low-pass filter are output from the bus line of the bus system, and outputting, using a power output device, electric power in the form of a high-frequency signal from the bus line for the electrical load.

The method achieves the same advantages as are specified above in regard to the apparatuses.

Further possible implementations of the disclosure also comprise not explicitly cited combinations of features or embodiments described above or below for the exemplary embodiments. In this case, a person skilled in the art will also add individual aspects as improvements or additions to the respective basic form of the disclosure.

BRIEF DESCRIPTION OF THE DRAWINGS

The disclosure is described in more detail below using exemplary embodiments and with reference to the accompanying drawing, in which.

In the figures, elements that are the same or have the same function are provided with the same reference symbols, unless indicated otherwise.

DETAILED DESCRIPTION

Figure 1:
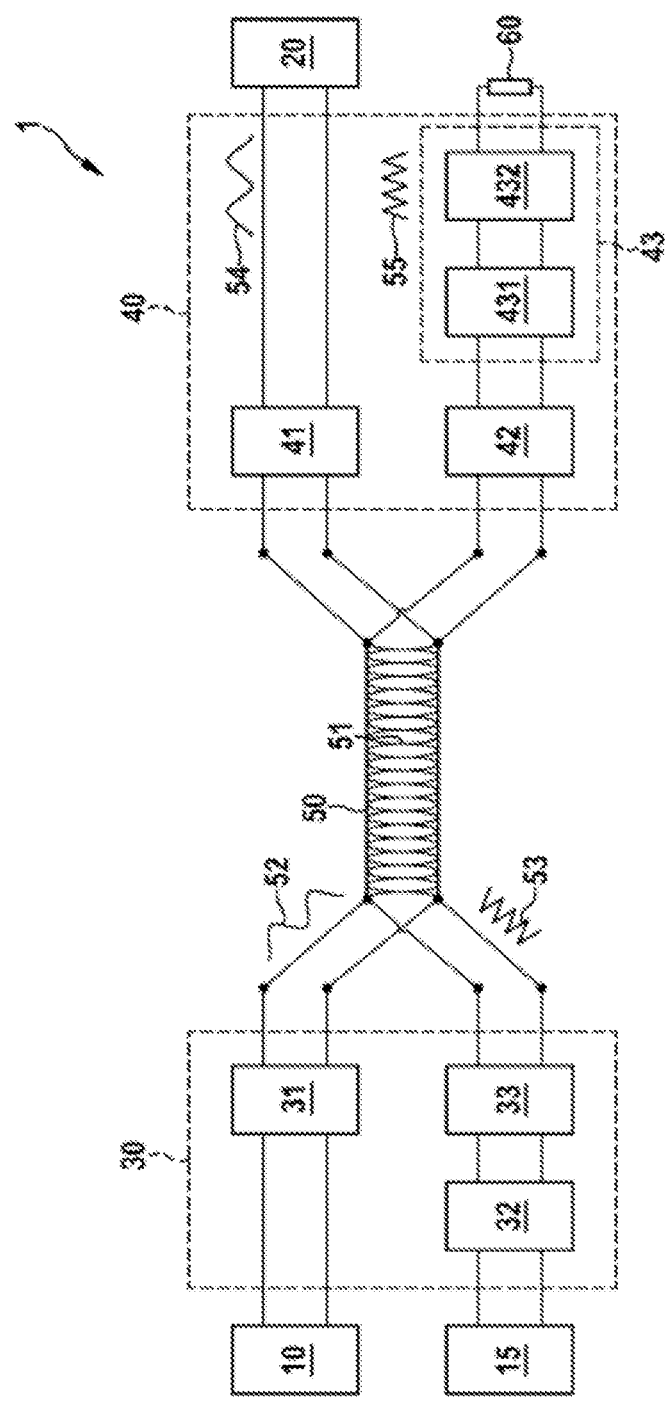
FIG. 1 shows a simplified block diagram of a bus system according to a first exemplary embodiment.

FIG. 1 shows a bus system 1 that can be used in a vehicle, in particular a motor vehicle, an aircraft, etc., or in hospitals, etc.

In FIG. 1, the bus system 1 has a first subscriber station 10, a power supply device 15, a second subscriber station 20, a first apparatus 30, a second apparatus 40 and a bus line 50 that interconnects the subscriber stations 10, 20, the power supply device 15 and an electrical load 60 depicted as an electric resistor. The electrical load 60 is an electrical appliance that needs electric power for operation.

The bus system 1 may be, by way of example, a CAN bus system, a CAN FD bus system, a LIN bus system, a bus system in accordance with the PSI5 standard or the FlexRay standard, etc. Quite generally, the bus system in the present exemplary embodiment is configured for a communication for which, at least intermittently, exclusive, collision-free access by one of the subscriber stations 10, 20 to the bus line 50 is ensured.

The first subscriber station 10 may be, by way of example, a controller or a display apparatus of a motor vehicle. The second subscriber station 20 may be, by way of example, a sensor of a motor vehicle.

The first subscriber station 10 and the power supply device 15 are connected to the bus line 50 via the first apparatus 30. The second subscriber station 20 and the electrical load 60 are connected to the bus line 50 via the second apparatus 40. The bus line 50 is used to transmit a bus signal 51 to the second subscriber station 20. The apparatus 30 inputs a communication signal 52 and a high-frequency signal 53, which is a high-frequency electric current delivering electric power, into the bus line 50 as bus signal 51. The second apparatus 40 outputs the bus signal 51 received by it from the bus line 50 as communication signal 54 and high-frequency signal 55.

Figure 2:
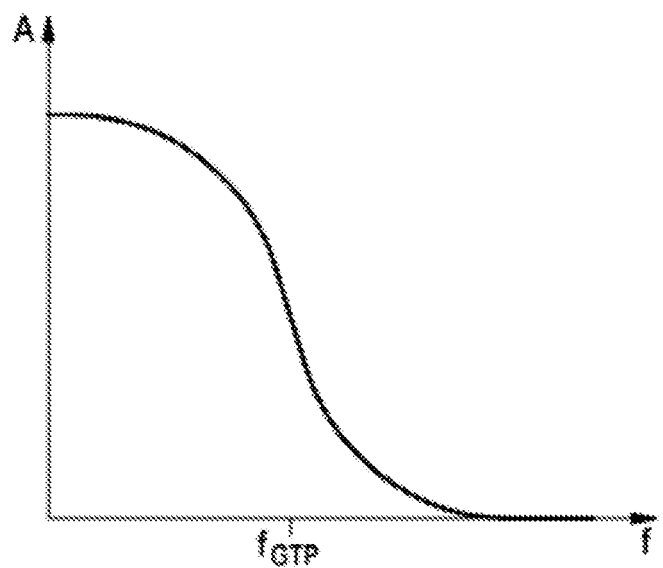
FIG. 2 shows a simplified frequency response of a low-pass filter of the bus system of FIG. 1.

For this, the apparatus 30 has a low-pass filter 31 that passes only the signal frequencies of the communication signal 52 below its cutoff frequency $f_{GTP}$, as shown in FIG. 2. FIG. 2 shows the frequency response of the ratio A of output voltage to input voltage of the low-pass filter 31 over frequency f.

Therefore, only the signal frequencies of the communication signal 52 below the cutoff frequency $f_{GTP}$ of the low-pass filter 31 are input into the bus line 50 of the bus system 1. The low-pass filter 31 may be configured as a resistor/capacitor combination, also generally called an RC element. The low-pass filter 31 is used for protecting the apparatus 30 against any radiated electromagnetic interference from other electrical appliances of the bus system 1 or its surroundings, so that the requirements in regard to electromagnetic compatibility (EMC) are observed.

Moreover, the apparatus 30 has a power input device 32 that uses a high-pass filter 33 to input a high-frequency signal 53 into the bus line 50. The high-frequency signal 53 is a high-frequency electric current delivering electric power for the electrical load 60. The high-frequency signal 53 can thus also be referred to as a high-frequency power signal.

The electric current is delivered by the power supply device 15 and converted into the high-frequency signal 53 by means of the power input device 32. The power input device 32 may accordingly be configured as a high-frequency generator and/or switched-mode power supply unit.

Figure 3:
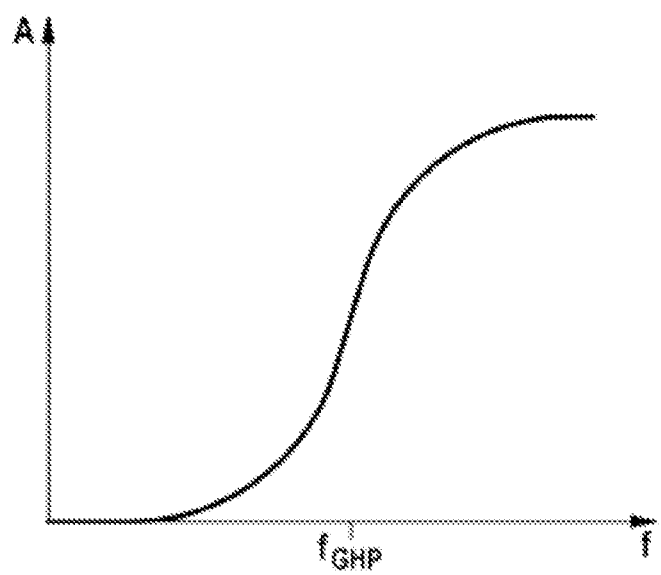
FIG. 3 shows a simplified frequency response of a high-pass filter of the bus system of FIG. 1.

The high-pass filter 33 of the apparatus 30 passes only the signal frequencies of the high-frequency signal 53 above its cutoff frequency $f_{GHP}$, as shown in FIG. 3. FIG. 3 shows the frequency response of the ratio A of output voltage to input voltage of the high-pass filter 33 over frequency f.

Therefore, only the signal frequencies of the high-frequency signal 53 above the cutoff frequency $f_{GHP}$ of the high-pass filter 33 are input into the bus line 50 of the bus system 1. The high-pass filter 33 may be configured as a capacitor/resistor combination, which is also generally referred to as a CR element.

Preferably, the cutoff frequency $f_{GTP}$ and the cutoff frequency $f_{GHP}$ are so far apart ($f_{GTP} < f_{GHP}$) that the alternate influencing is very low. In this case, the spectra (frequencies used) of the communication signal 52 and the high-frequency signal 53 provided for providing the electric power do not overlap, since the signals are adequately reciprocally attenuated on the two paths. For filtering, the alternate influencing can be decreased e.g. by increasing the selectivity.

The cutoff frequency $f_{GTP}$ of the low-pass filter 31 and the cutoff frequency $f_{GHP}$ of the high-pass filter 33 may be in the range from 20 to 50 MHz. The choice of cutoff frequencies $f_{GTP}$, $f_{GHP}$ is accordingly geared to the symbol rate or data rate at which the bus system 1 is operated. At the frequencies in the range from 20 to 50 MHz, typically only a few signal components of the communication signal 52 are present in the case of a CAN bus system.

The choice of frequency fp of the high-frequency signal 53 for power transmission can be chosen according to different EMC criteria. By way of example, the high-frequency signal 53 can also be spread and jittered over a frequency range in order to lower the power spectral density of the signal 53. To spread or scatter in the frequency spectrum, it is also possible, in addition or as an alternative to the jittered signals, for pseudo-noise signals and/or multiple carriers to be used, as in the case of a clock of a central processing unit (CPU).

As FIG. 1 moreover shows, the apparatus 40 likewise has a low-pass filter 41 and a high-pass filter 42. The low-pass filter 41 has the same function as the low-pass filter 31. The high-pass filter 42 has the same function as the high-pass filter 33.

The second apparatus 40 moreover has a power output device having a switched-mode power supply unit 431 that supplies the high-frequency signal 53 or power signal to a low-pass filter 432. The low-pass filter 432 also has the same function as the low-pass filter 31.

Therefore, the second subscriber station 20 has not only low-pass filtering performed for the low-pass filter 41 to obtain the communication signal 54 but also output of a high-frequency signal 55 by the high-pass filter 42 matched to the characteristic impedance of the bus line 50. In this case, the switched-mode power supply unit 43, which is configured as a rectifier, is subsequently used to perform rectification and optional low-pass filtering. This achieves smoothing of the signal 55, which serves as a supply of electric power to the electrical load 60.

The bus line 50 can therefore be used to transmit a message in the form of the communication signal 52 and the communication signal 54 received on the part of the subscriber station 20 between the subscriber stations 10, 20. Additionally, the bus line 50 is also used to provide the power supply for the electrical load 60 in the case of the second subscriber station 20.

In one configuration, the first subscriber station 10 may also be an already existing CAN subscriber station (CAN node) that is connected to an existing bus line 50 by means of the low-pass filter 31. For the other CAN subscriber stations, an appropriate optional addition by means of a low-pass filter 41 is performed.

Therefore, in the bus system 1 described above, the subscriber station 10 has conversion of an electric current for the supply of power to the electrical load 60 into a high-frequency signal 53 performed e.g. by the switched-mode power supply unit 32 and said high-frequency signal is input into the bus line 50 via the high-pass filter 33, which is used for decoupling the impedance in the low frequency range. In this context, the output-side matching of the high-pass filter 33 to the characteristic impedance of the bus line 50 is advisable.

As a result of the EMC criteria, the field of application is particularly advantageously regarded as simple sensors, which are more robust toward radiated electromagnetic interference, since the possible radiation/power density falls proportionally with the power draw. Particularly for simple sensors, the large numbers mean that a great savings potential for the wiring of the bus system 1 arises in this case, however.

Figure 4:
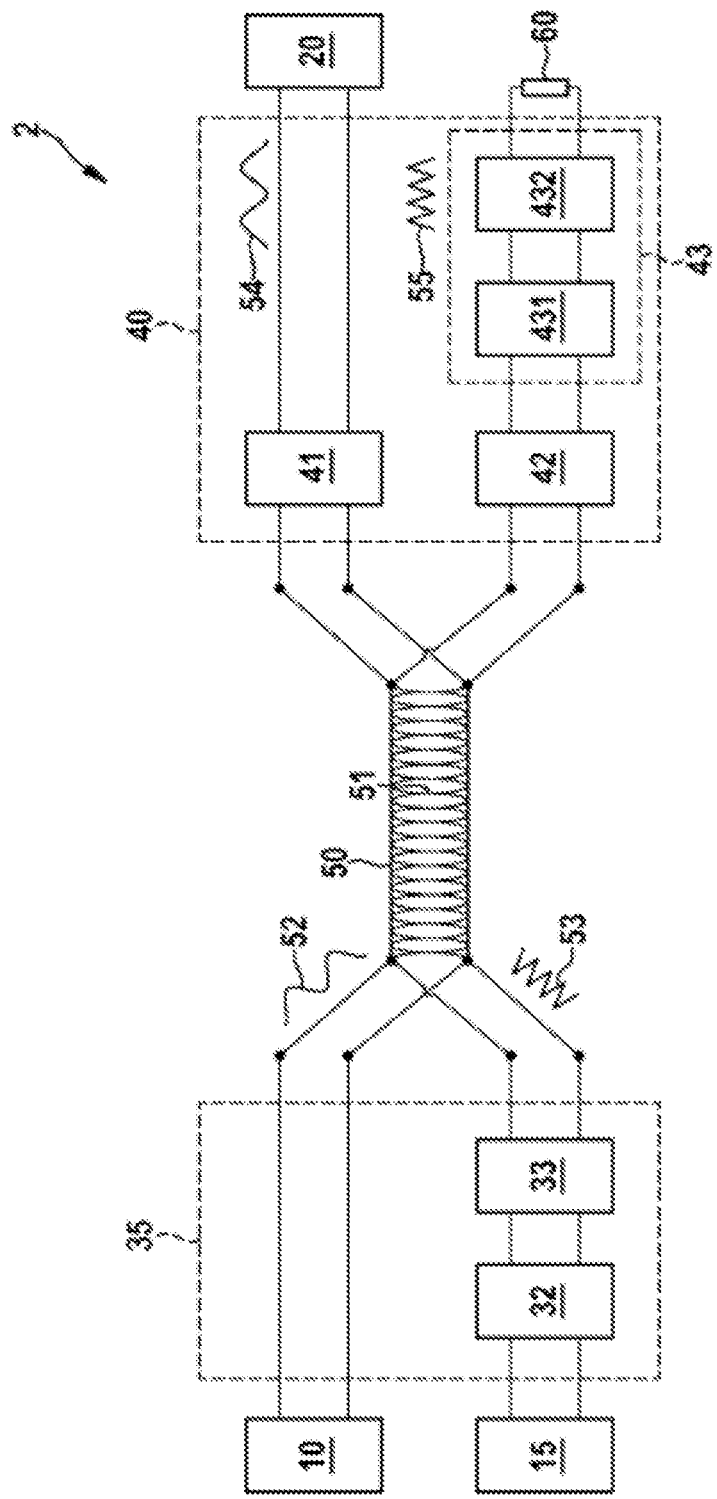
FIG. 4 shows a simplified block diagram of a bus system according to a second exemplary embodiment.

FIG. 4 shows a bus system 2 according to a second exemplary embodiment. The bus system 2 according to the second exemplary embodiment is largely designed in the same manner as described in regard to the bus system 1 according to the first exemplary embodiment.

In contrast to the bus system 1 according to the first exemplary embodiment, however, the bus system 2 according to the second exemplary embodiment has an apparatus 35 that has no low-pass filter 31 as in the case of FIG. 1. This may be advantageous in the case of a CAN bus system 2, for example, in which the CAN communication control device (CAN controller) already performs the function of the low-pass filter 31, or if the situation exists that no additional components are desirable for reasons of cost. In this case, it is then advantageous to establish the high-frequency signal 53 or power signal in a sufficiently high frequency range in which the signal frequencies of the communication signal are influenced only to a small extent (the usual spectrum generally drops off sharply at high frequencies).

Figure 5:
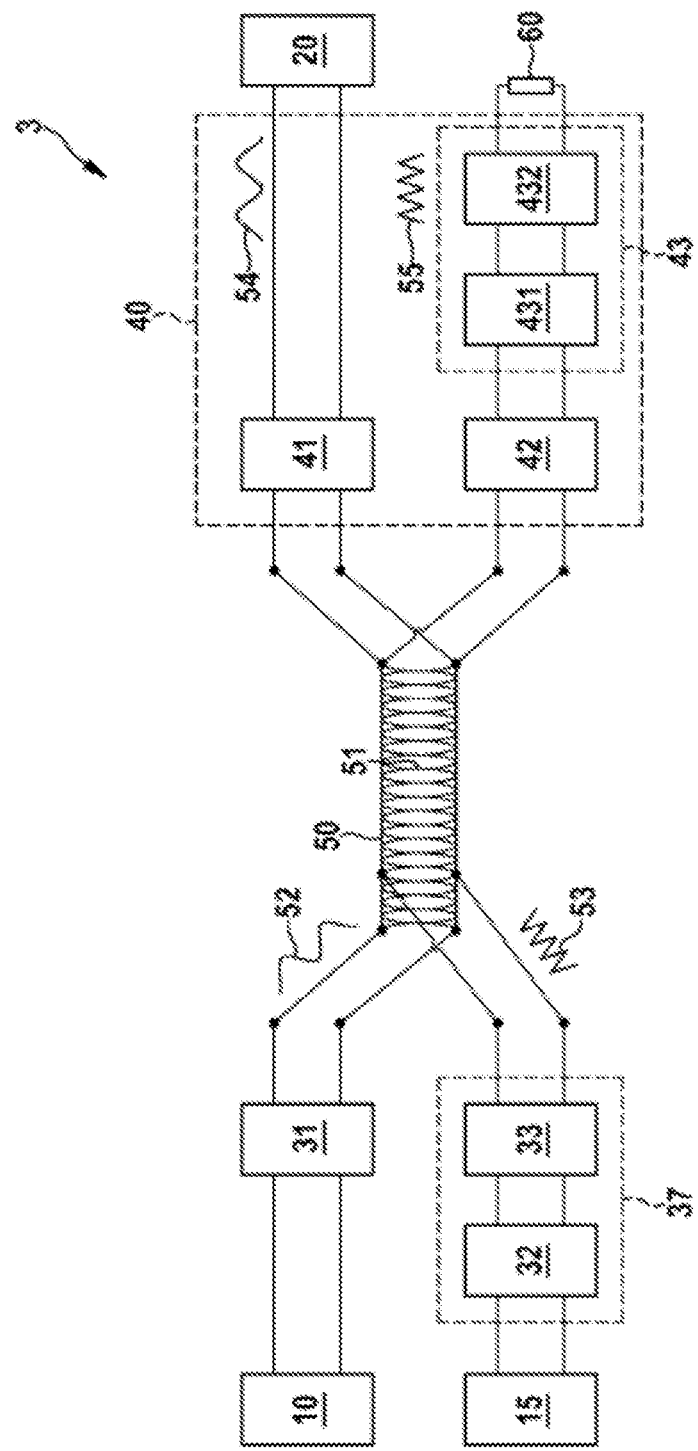
FIG. 5 shows a simplified block diagram of a bus system according to a third exemplary embodiment.

FIG. 5 shows a bus system 3 according to a third exemplary embodiment. The bus system 3 according to the third exemplary embodiment is largely designed in the same manner as described in regard to the bus system 1 according to the first exemplary embodiment.

In contrast to the bus system 1 according to the first exemplary embodiment, the bus system 3 according to the third exemplary embodiment has the input of the high-frequency signal 53 for supplying electric power to the electrical load 60 provided at a different location on the bus line 50 than the input of the communication signal 52. The high-frequency signal 53 can be input at any location on the bus line 50. Therefore, the bus system 3 has an apparatus 37 that likewise has no low-pass filter 31, as described for the second exemplary embodiment.

All the previously described configurations of the bus systems 1, 2, 3, the subscriber stations 10, 20, the bus line 50 and the method can be used individually or in every possible combination. In particular, all the features of the previously described exemplary embodiments can be combined as desired or else omitted. Additionally, the following modifications, in particular, are conceivable.

The bus system 1, 2, 3, with the bus line 50 according to the exemplary embodiments, is described with reference to a bus system based on the CAN protocol. The bus system according to the exemplary embodiments may also be another kind of communication network, however. It is advantageous, but not a necessary requisite, for exclusive, collision-free access by a subscriber station 10, 20 to a shared channel to be ensured, at least for particular periods of time, on the first bus system in the communication system 1.

The number of subscriber stations 10, 20 can be chosen as required. It is also possible for more than two subscriber stations. It is also possible for there to be only subscriber stations 10 or subscriber stations 20 in the bus system 1, 2, 3.

As a modification to the bus systems 1, 2, 3, it is also conceivable to use the ground as an additional connection between the subscriber stations 10, 20 for the transmission of the high-frequency signal 53. This is possible through phantom powering, for example.

In all the exemplary embodiments, the filters 31, 33, 41, 42, 432 may be configured in a different form. By way of example, an embodiment with/without an isolating transformer or common mode choke (CMC) can be used. Moreover, a combination of the low-pass filters 31, 41, 432 with a common mode choke (CMC) is conceivable.

To generate the HF power on the power supply device 15 as a source, it is possible for different methods to be used. The aforementioned switched-mode power supply units are just one of many options.

At the sink or electrical load 60, it is possible for various principles to be used to implement the switched-mode power supply unit 431 as a rectifier. By way of example, a rectification function is also possible with a diode circuit.

The matching of the high-pass filters 33, 42 to the bus line 50 or the characteristic impedance thereof is possible adaptively, that is to say possible in a manner matched to the respectively prevailing circumstances. This allows even possibly occurring fluctuations as a result of different loads, such as multiple subscriber stations 10, 20, to be equalized.

The power supply device 15 may be integrated in the subscriber station 10 or 20 or else provided separately.

The electrical load 60 does not have to be integrated in the subscriber station 20, such as when the subscriber station 20 is a sensor, for example. The electrical load 60 may also be provided separately or in addition to the subscriber station 20, for example as a further sensor.

In the product or the subscriber stations 10, 20, a combination with other communication systems is conceivable, which means that the bus line 50 can be used in the HF domain at the same time besides the CAN system by parallel HF communication systems, preferably decoupled from one another.

The invention claimed is:

1. An apparatus for inputting a communication signal and electric power for at least one electrical load into a bus line for a bus system, comprising:
   a low pass filter configured to filter the communication signal, such that signal frequencies below a cutoff frequency of the low pass filter are input into the bus line of the bus system; and
   a power input device configured to input electric power as a high frequency signal into the bus line,
   wherein the power input device is configured to at least one of spread and jitter a frequency of the high-frequency signal in a frequency domain,
   wherein:
      the power input device includes a switched mode power supply unit configured to generate the high frequency signal, and
      an input of the communication signal is configured in regard to a communication for which, at least intermittently, exclusive, collision free access by one of at least two subscriber stations of the bus system to the bus line is ensured,
   wherein the power input device further includes a downstream high pass filter configured to filter a signal of the switched mode power supply unit, such that signal frequencies above a cutoff frequency of the high pass filter are input into the bus line.

2. A method for transmitting a communication signal and electric power between two subscriber stations of a bus system, comprising:
   inputting the communication signal into a bus line of the bus system via a low-pass filter that filters the communication signal, such that signal frequencies below a cutoff frequency of the low-pass filter are input into the bus line;
   inputting, using a power input device, electric power as a high frequency signal into the bus line;
   transmitting the communication signal and the electric power as a bus signal to an electrical load using the bus line;
   outputting the communication signal from the bus line via another low-pass filter that filters the bus signal, such that signal frequencies below a cutoff frequency of the other low-pass filter are output from the bus line; and
   outputting, using a power output device, electric power as a high frequency signal from the bus line for the electrical load,
   wherein the power input device is configured to at least one of spread and jitter a frequency of the high-frequency signal in a frequency domain,
   wherein:
      the power input device includes a switched mode power supply unit configured to generate the high frequency signal, and
      an input of the communication signal is configured in regard to a communication for which, at least intermittently, exclusive, collision free access by one of at least two subscriber stations of the bus system to the bus line is ensured, wherein the power input device further includes a downstream high pass filter configured to filter a signal of the switched mode power supply unit, such that signal frequencies above a cutoff frequency of the high pass filter are input into the bus line.

\* \* \* \* \*